US011289911B2

(12) United States Patent
Kuestermann et al.

(10) Patent No.: US 11,289,911 B2
(45) Date of Patent: Mar. 29, 2022

(54) MAGNETICALLY CONTROLLABLE INDUCTOR IN A SERIES CIRCUIT

(71) Applicant: SIEMENS ENERGY GLOBAL GMBH & CO. KG, Munich (DE)

(72) Inventors: Matthias Kuestermann, Nuremberg (DE); Thomas Manthe, Ueckermuende (DE); Ronny Fritsche, Hartenstein Ot Rupprechtstegen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/289,843

(22) PCT Filed: Oct. 1, 2019

(86) PCT No.: PCT/EP2019/076538
§ 371 (c)(1),
(2) Date: Apr. 29, 2021

(87) PCT Pub. No.: WO2020/088870
PCT Pub. Date: May 7, 2020

(65) Prior Publication Data
US 2021/0408792 A1    Dec. 30, 2021

(30) Foreign Application Priority Data

Oct. 29, 2018  (DE) .......................... 102018218477.1

(51) Int. Cl.
*H02J 3/18* (2006.01)
*H01F 27/28* (2006.01)

(52) U.S. Cl.
CPC ............ *H02J 3/1842* (2013.01); *H01F 27/28* (2013.01); *H02J 3/1807* (2013.01); *H02J 3/1864* (2013.01)

(58) Field of Classification Search
CPC ...... H02J 3/1842; H02J 3/1807; H02J 3/1864; H02J 3/185; H02J 3/1857; H01F 27/28
See application file for complete search history.

(56) References Cited

U.S. PATENT DOCUMENTS 9,391,502 B2 *  7/2016  Martaeng ............ H01M 10/625
10,056,886 B2    8/2018  Bunin et al.
(Continued)

FOREIGN PATENT DOCUMENTS

| CN | 104810837 A | 7/2015 |
| EP | 3168708 A1 | 5/2017 |
| WO | WO 8704538 A1 | 7/1987 |

*Primary Examiner* — Nguyen Tran
(74) *Attorney, Agent, or Firm* — Laurence A. Greenberg; Werner H. Stemer; Ralph E. Locher

(57) ABSTRACT

A device is for reactive power compensation in a high-voltage network having a phase conductor. The device has a first high-voltage terminal, which is configured to be connected to the phase conductor. For each first high-voltage terminal, a first and a second core section, which are part of a magnetic circuit, a first high-voltage winding, which encloses the first core section, and a second high-voltage winding are provided. Moreover, the device has a saturation switching branch, which saturates the core sections and has controllable power semiconductor switches. A control unit is used to control the power semiconductor switches. The first and the second high-voltage windings are connected by the high-voltage end to the associated first high-voltage terminal and on the low-voltage side can be connected to one or the saturation switching branch. To be able to be connected in series into the high-voltage network, a second high-voltage terminal is provided.

13 Claims, 5 Drawing Sheets

(56) References Cited

U.S. PATENT DOCUMENTS

2010/0231039 A1\* 9/2010 Wallmeier ............ C01B 33/035
                                                        307/17
2014/0097747 A1\* 4/2014 Bader ................... H01J 25/025
                                                        315/3

\* cited by examiner

MAGNETICALLY CONTROLLABLE INDUCTOR IN A SERIES CIRCUIT

BACKGROUND OF THE INVENTION

Field of the Invention

The invention relates to an apparatus for reactive power compensation in a high-voltage network having at least one phase conductor, having at least one first high-voltage connection which is configured for connection to in each case one phase conductor, wherein a first and a second core section which are part of a closed magnetic circuit, a first high-voltage winding which surrounds the first core section and a second high-voltage winding which surrounds the second core section and is connected in parallel with the first high-voltage winding, at least one saturation switching branch which is configured to saturate the core sections and has controllable power semiconductor switches, and a control unit for controlling the power semiconductor switches are provided for each high-voltage connection, wherein the first and second high-voltage windings are connected, by way of their high-voltage end, to the associated high-voltage connection and can be connected, on their low-voltage side, to a or the saturation switching branch.

Such an apparatus is already known from EP 3 168 708 A1. A so-called "Full Variable Shunt Reactor" (FVSR) is disclosed there. The previously known apparatus has two high-voltage windings for each phase which are connected in parallel with one another and each surround a core limb of a closed iron core and are connected, at their high-voltage end, to a phase conductor of a high-voltage network. The low-voltage sides of the high-voltage windings can be connected either to an expediently polarized converter or directly to a ground connection with the aid of a transistor switch. The converter is configured to generate a direct current in the high-voltage winding connected to it. In this case, the direct current is set in such a manner that the core limb surrounded by the winding is driven into a desired saturation state. In this saturation state, the core material has a very low magnetic permeability, for example, as a result of which the magnetic resistance of the winding is increased and its inductance is reduced. The saturation of said core sections is dependent on polarization, with the result that an alternating current flowing via the windings flows substantially only via one of the two high-voltage windings depending on its polarization. For example, a positive alternating current flows via the first high-voltage winding, while a negative alternating current flows to ground via the second high-voltage winding. If the current is driven only via one high-voltage winding, a direct current can be applied to the respective other winding, through which the alternating current is not currently flowing, in order to saturate the core limb surrounded by it to the desired extent.

The previously known apparatus has the disadvantage that it can be connected only in a parallel circuit to the phase conductor(s) of the supply network. If an apparatus is connected in parallel, it is connected, by way of one of its sides, to the high-voltage potential of the phase conductor, while the side facing away from the high-voltage connection is at ground potential.

SUMMARY OF THE INVENTION

The object of the invention is to provide an apparatus of the mentioned at the outset in can be serially connected into the high-voltage network.

The invention achieves this object by virtue of the fact that a second high-voltage connection is provided and is likewise used for connection to the phase conductor, wherein the saturation switching branch is connected, on its side facing away from the high-voltage winding(s), to the second high-voltage connection, with the result that the apparatus can be connected in series into the phase conductor.

Within the scope of the invention, the second connection of the apparatus, which is at ground potential in the prior art, is a high-voltage connection. This second high-voltage connection is likewise provided for connection to the phase conductor, with the result that the entire apparatus is connected in series into the respective phase conductor. In this case, within the scope of the invention, the saturation switching branch is connected, on its side facing away from the high-voltage windings, to the second high-voltage connection. Within the scope of the invention, the saturation switching branch can be connected to the second high-voltage connection directly, that is to say without the interposition of further components or component parts. Alternatively, however, within the scope of the invention, it is also possible to arrange further components in the current path between the saturation switching branch and the second high-voltage connection.

The series-connected apparatus is partly arranged, for example, on a platform, wherein some of the components which are at a high voltage during operation are elevated on a platform. In contrast, other components which are at high voltage may be arranged in the tank which is at ground potential and is placed on the floor. Voltage drops, for example in the medium-voltage range of 1 kV to 50 kV, occur between the components arranged on the platform. However, these medium-voltage drops can be handled more cost-effectively than high-voltage drops of generally 100 kV to 800 kV, wherein the components used for this purpose are known from medium-voltage technology. Within the scope of the invention, further components, for example capacitive component parts and the like, may be arranged on the high-voltage platform.

According to a first variant of the invention, the first and second high-voltage windings are connected to the first high-voltage connection. Additional component parts or components may be arranged between the first high-voltage connection and the high-voltage windings.

The second high-voltage connection is advantageously connected to the saturation switching branch via at least one capacitive unit. Components, for example capacitors or the like, which act capacitively are referred to here as a capacitive unit, wherein the phase of the current leads the phase of the voltage. Inductively acting units or component parts produce the opposite effect, with the result that the current lags the voltage.

The high-voltage windings and the saturation switching branch can be expediently bridged by means of a bridging branch, wherein a capacitive unit is arranged in the bridging branch. As already stated, the apparatus according to the invention constitutes a so-called "Full Variable Shunt Reactor" (FVSR). With the aid of the saturation switching branch, it is possible to saturate the core of the high-voltage windings, with the result that it is possible to compensate for reactive power in the supply network, which is constructed from the phase conductor(s), on account of the inductive action of the high-voltage windings in the respective half-wave. In order to be able to not only provide the inductive actions of the high-voltage windings, a capacitive unit is provided and is connected in parallel with the saturation switching branch and the high-voltage windings. The control bandwidth can be increased on account of this parallel circuit.

According to one configuration of the invention which is preferred in this respect, a protective branch, in which a non-linear resistor is arranged, is connected in parallel with the bridging branch. The protective branch is used to protect from overvoltages which can occur in the event of a fault and can destroy, in particular, the power semiconductor switches in the saturation switching branch. In the normal voltage range, that is to say in the range of the operating voltage, the non-linear resistor has a low conductivity and therefore a high resistance. In the event of overvoltages, however, the resistance is reduced, with the result that the high voltages are reduced by the resistance. The components connected in parallel, that is to say the high-voltage winding and, in particular, the saturation switching branch, are therefore protected from overvoltages.

According to one preferred variant of the invention, the capacitive unit is in the form of a capacitor or a capacitor bank. A capacitor bank comprises a plurality of transformers which are connected in series and in parallel with one another and, as a complete unit, act like a capacitor. A capacitor in the current path causes the phase of an alternating current to lead the phase of the driving voltage.

According to one preferred variant of the invention, each high-voltage winding and each saturation switching branch are arranged in a tank filled with an insulating fluid. According to one variant, the high-voltage windings and the saturation switching branch are arranged in the same tank. However, within the scope of the invention, it is also possible for the high-voltage windings and the power electronics of the saturation switching branch to be arranged in different tanks or housings. In this case, both housings are filled with an insulating fluid, wherein bushings are provided in order to enable the electrical connection of the components arranged in the tank to one another. A mineral oil, an ester oil or the like comes into consideration as the insulating fluid, for example. Different insulating fluids may be provided in different tanks. However, the insulating fluid is preferably the same in all tanks. In a deviation from this, the insulating fluid may also be in the form of a protective gas.

Each saturation switching branch preferably has at least one two-pole submodule with a bridge circuit which has power semiconductor switches and a DC voltage source, with the result that the DC voltage source can be either connected in series with at least one high-voltage winding or bridged depending on the control of the power semiconductor switches. When the power semiconductor switches are controlled expediently, the DC voltage source then provides the necessary voltages and direct currents for saturating the core of the high-voltage windings.

Each submodule is preferably in the form of a full-bridge circuit having a first series circuit branch and a second series circuit branch which are each connected in parallel with the DC voltage source. Each series circuit branch has a series circuit comprising two power semiconductor switches, wherein the potential point between the power semiconductor switches of the first series circuit branch is connected to a first connection terminal of the submodule and the potential point between the power semiconductor switches of the second series circuit branch is connected to the second connection terminal of the submodule. Full-bridge circuits enable polarization reversal at the connection terminals, which is not possible with a so-called half-bridge circuit which has only one parallel branch with two power semiconductor switches.

Each power semiconductor switch is preferably an IGBT with a freewheeling diode connected in parallel in an opposite sense, a so-called GTO or a transistor switch. Within the scope of the invention, it is advantageous for each power semiconductor switch to be able to be changed from its interrupter position, in which a current cannot flow via the power semiconductor switch, into its on-state position, in which a current can flow via the power semiconductor switch, or vice versa. Such power semiconductor switches are also referred to as disconnectable power semiconductor switches which can even interrupt a short-circuit current flowing via them if suitable measures have been taken to reduce the energies produced in this case.

Each DC voltage source is preferably an energy store. Electrical energy stores which are preferably unipolar advantageously come into consideration as energy stores. Capacitors, supercapacitors, superconductive coils, battery accumulators, supercaps or the like come into consideration as energy stores, for example. The energy stores listed or other energy stores may appear individually in a submodule or a plurality of them are connected in series. Within the scope of the present invention, the term "energy store" is used overall to refer to this series circuit.

The energy store is expediently connected to a charging unit for charging the energy store. The energy store can preferably be connected to a supply network. This is expediently carried out via a charging unit which may fundamentally have any desired configuration within the scope of the invention. However, the important factor is that energy can be drawn from the supply network via the charging unit and can be stored in the energy store. This energy then enables the current flow for saturating the respective high-voltage winding.

Additional windings are expediently provided and are inductively coupled to the high-voltage windings, wherein the additional windings are connected to at least one capacitively acting component part. Within the scope of the invention, the additional windings are inductively coupled to at least one of the high-voltage windings of the FVSR. In this case, the additional windings are connected to a capacitively acting component part. The term "connected" is used to mean that each capacitively acting component part is electrically connected to at least one of the additional windings either directly or via an electrical component part, for example a switching unit. The capacitive component part, for example a capacitor or a "Flexible AC Transmission System" (FACTS) component equipped with capacitors, for example a "Static Synchronous Compensator" (STATCOM), can therefore influence the degree and direction of reactive power compensation. In this case, the control unit can control the power semiconductor switches of the FVSR in such a manner that the inductive effect of the high-voltage winding is virtually completely reversed during reactive power compensation, with the result that only the capacitive component part develops its action and contributes to overall capacitive reactive power compensation. In a deviation from this, the control unit can ensure that the inductive action of the high-voltage windings completely takes effect, such that the action of the capacitive component part is superimposed, with the result that inductive reactive power compensation takes place overall.

The capacitive component part expediently has a capacitor or a capacitor bank.

Further expedient configurations and advantages of the invention are the subject of the following description of exemplary embodiments of the invention with reference to the figures of the drawing, wherein identical reference signs refer to identically acting component parts.

DETAILED DESCRIPTION OF THE INVENTION

Figure 1:
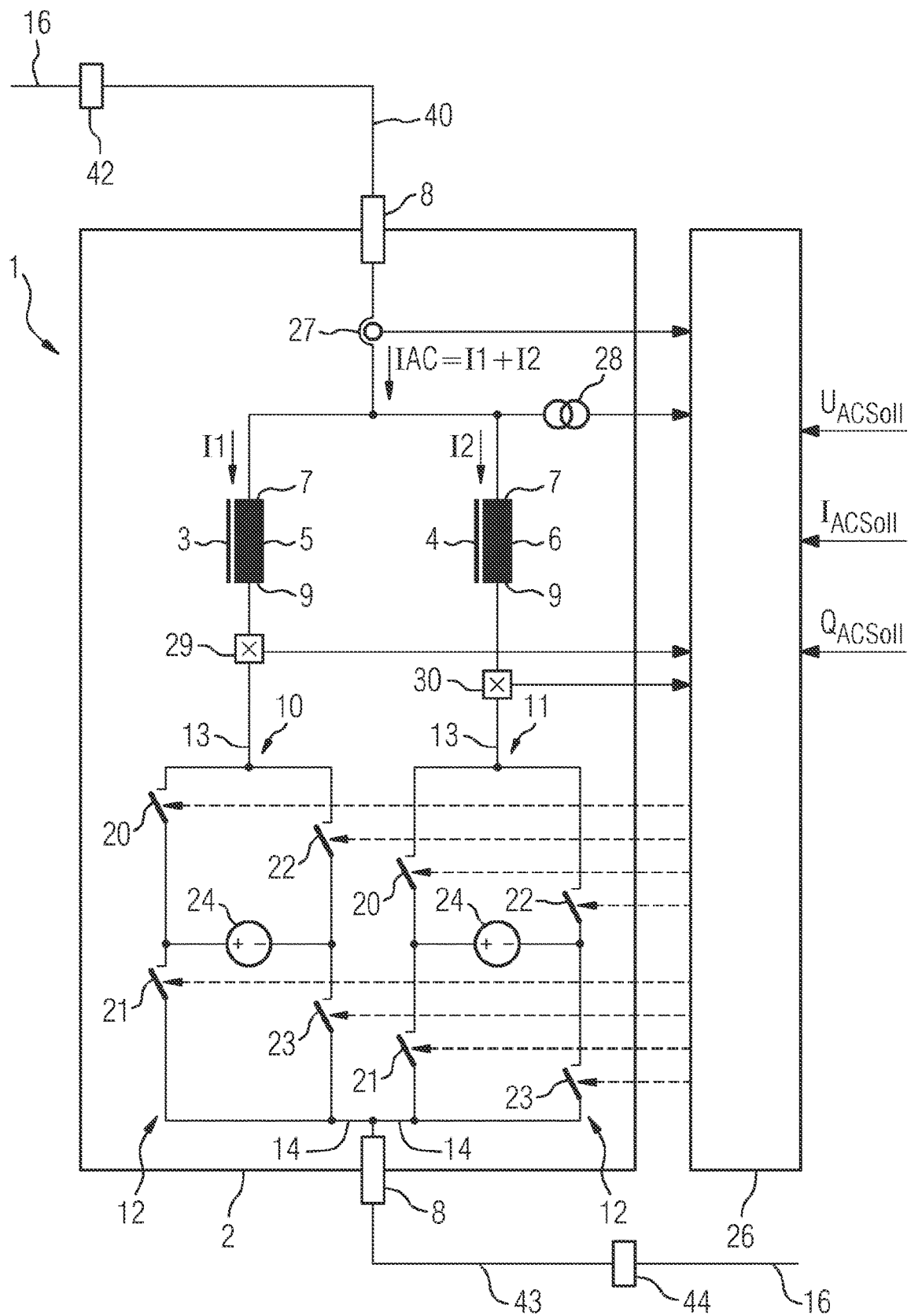
FIG. 1 shows a schematic illustration of an exemplary embodiment of the apparatus according to the invention.

FIG. 1 shows an exemplary embodiment of the apparatus 1 according to the invention which has a tank 2 filled with an insulating fluid. Mineral oils or else ester fluids or the like come into consideration as the insulating fluid. Gaseous insulating fluids are also possible within the scope of the invention.

The insulating fluid provides, on the one hand, the necessary dielectric strength for component parts of the apparatus 1, which are at a high-voltage potential, with respect to the tank 2 which is at ground potential. In addition, the insulating fluid is used to cool the components which generate heat during operation.

Arranged inside the tank 2 is a core which is composed of a magnetizable material, preferably a ferromagnetic material, for example iron. In order to avoid eddy currents, the core is assembled on iron sheets which rest flat on one another. In this case, the core forms a first core limb 3 and a second core limb 4 as core sections.

The first core limb 3 is surrounded by a first high-voltage winding 5. The second core limb 4 is surrounded by a second high-voltage winding 6. In order to form a closed magnetic or iron circuit, the yokes which are not illustrated in the figures and extend from the upper end of the core limb 3 to the upper end of the core limb 4 and from the lower end of the core limb 3 to the lower end of the core limb 4. Two return limbs which are likewise not illustrated in the figures, are not surrounded by a winding and extend parallel to the core limbs 3 and 4 on the right and on the left are also provided. In other words, a so-called 2/2 core is provided.

The first high-voltage winding 5 and the second high-voltage winding 6 each have a high-voltage end 7, by way of which they are connected to a high-voltage bushing 8 which is used to guide the connection lines, which are at a high-voltage potential during operation, through the wall of the tank 2 that is at ground potential.

In this case, the high-voltage bushing 8 engages through the wall of the tank and is equipped with an open-air connection at its free end arranged outside the tank 2. The open-air connection which is not illustrated in the figures is used to connect an air-insulated conductor 40, via which the high-voltage windings 5 and 6 are connected to a first high-voltage connection 42, via which the entire apparatus 1 can be connected to a phase conductor 16 of a high-voltage supply network. For each other phase conductor of the high-voltage network, which are not shown here for reasons of clarity, the apparatus 1 has an identical structure to that shown in FIG. 1. These components are also not shown for reasons of clarity. It goes without saying that cable connections are also possible within the scope of the invention.

At their ends 9 facing away from the first high-voltage connection 42, the first high-voltage winding 5 and the second high-voltage winding 6 are each connected to a saturation switching branch 10 and 11, respectively, wherein each saturation switching branch 10, 11 has a two-pole submodule 12 connected, by way of a first connection terminal 13, to the respective high-voltage winding 5 and 6 and, by way of a second connection terminal 14, to the insertion end of a high-voltage bushing 8 which likewise extends through the wall of the tank 2. This high-voltage bushing 8 also has an open-air connection which is connected to a second high-voltage connection 44 via a connection mine 43. In the exemplary embodiment shown, the second high-voltage connection 44 is likewise connected to the phase conductor 16. In other words, the apparatus 1 according to the invention which is shown is connected into the supply network in series with the phase conductor 16.

Within the scope of the invention, it is important for each saturation switching branch 10 or 11 to have a two-pole submodule 12 which has a bridge circuit comprising power semiconductor switches 20, 21, 22 and 23 and a DC voltage source 24 which is preferably unipolar and therefore has a fixed positive pole and a fixed negative pole.

Within the scope of the invention, the bridge circuit may be a half-bridge or a full-bridge. In FIG. 1, each submodule has a full-bridge and comprises four power semiconductor switches 20, 21, 22 and 23. A half-bridge comprises only two of the power semiconductor switches. In order to expediently control the four power semiconductor switches 20, 21, 22 and 23, provision is made of a control unit 26 which can be supplied, on the input side, with desired values for the voltage $U_{ACSoll}$, the alternating current $I_{ACSoll}$ and the reactive power $Q_{ACSoll}$. A current sensor 27 is used to capture the alternating current $I_{AC}$ flowing from the phase conductor 16 to the high-voltage windings, wherein a voltage sensor 28 captures the voltage dropped on the high-voltage side of the high-voltage windings 5 and 6. The current sensor 27 and the voltage sensor 28 are connected to the control unit 26 via signal lines which are not illustrated in the figures. On the low-voltage side of the high-voltage winding 5 and 6, respectively, it is likewise possible to see sensors 29 and 30 which are likewise connected to the control unit 26 via signal lines and capture currents which flow between the respective submodule 12 and the respective high-voltage winding 5 or 6. The power semiconductor switches 20, 21, 22 and 23 of a submodule 12 can be changed, by means of expedient control signals represented by dashed lines, by the control unit 26 from a disconnection position, in which a current flow is interrupted via the power semiconductor switches, to a conducting position, in which a current flow is possible via the power semiconductor switches, or vice versa from the conducting position to the disconnection position.

The method of operation of the apparatus 1 is as follows: if the voltage captured by the voltage sensor 28 is positive, the power semiconductor switches 22 and 23 of the saturation switching branch 10 are closed. It shall be presupposed at this that the core limb 3 has previously been saturated by a direct current flowing from the submodule 12 of the first saturation switching branch 10 to the high-voltage winding 5, with the result that the AC resistance of the high-voltage winding 5 is lower than the AC resistance of the high-voltage winding 6 for the positive half-wave of the AC voltage. Virtually the entire alternating current $I_{AC}$ therefore flows to the second high-voltage connection 44 via the current path denoted $I_1$. In the positive half-wave of the AC voltage, the power semiconductor switches 21 and 22 are therefore closed, with the result that the DC voltage source 24 of the saturation circuit 11 drives a direct current which flows from the high-voltage winding 6 to the second high-voltage connection 44. During the positive half-wave of the AC voltage in the phase conductor 16, the second core limb can therefore be saturated in the desired manner.

In contrast, during the negative half-wave in which the voltage measured by the sensor 28 is negative, an alternating current $I_{AC}$ flows substantially via the second high-voltage winding 6, with the result that a saturation direct current is generated by closing the power semiconductor switches 20 and 23 and opening the power semiconductor switches 21 and 22 of the submodule 12 of the first saturation switching branch 10, which saturation direct current flows from the submodule 12 to the first high-voltage winding 5 or vice versa and therefore ensures the desired saturation of the core limb 3.

Figure 2:
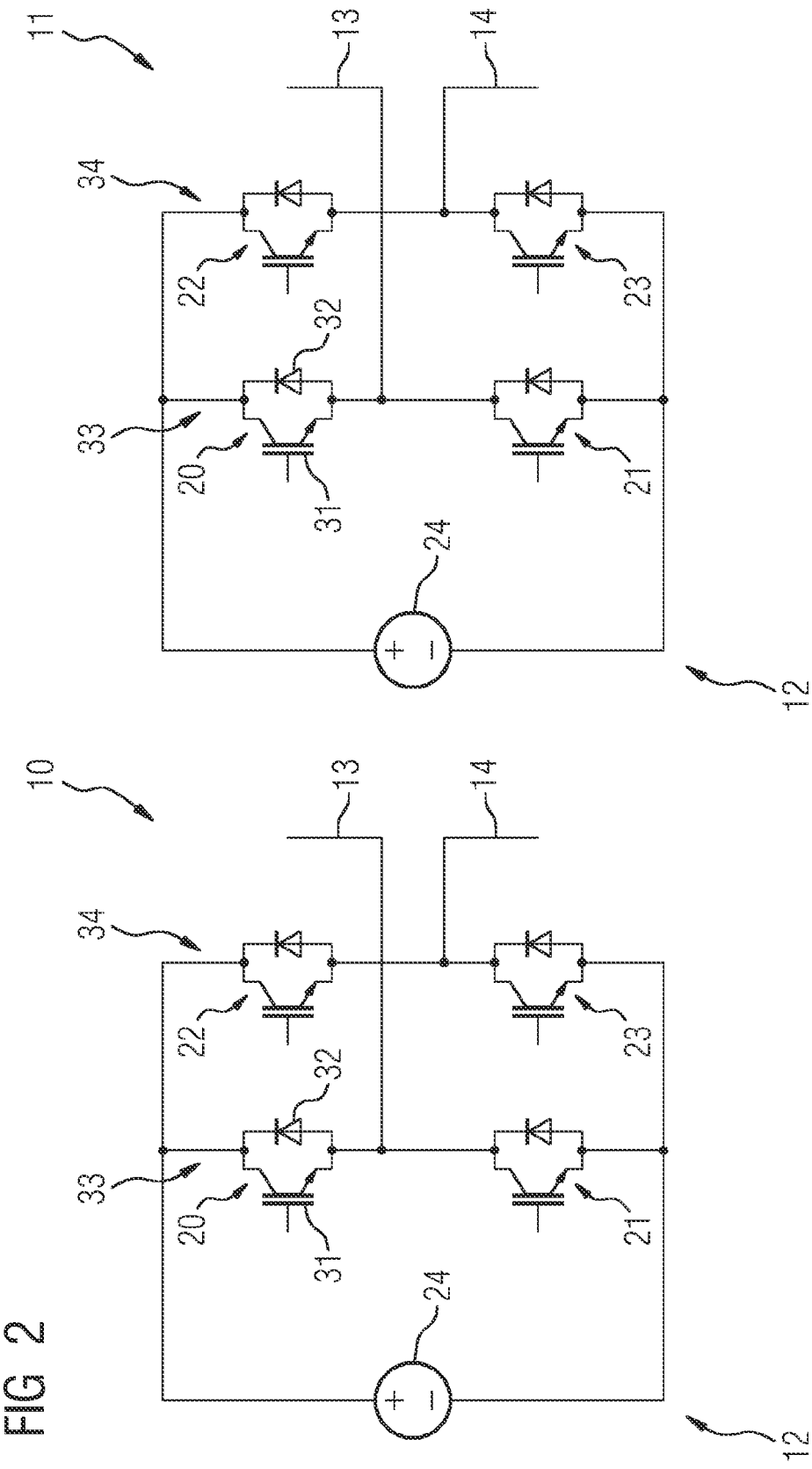
FIG. 2 shows the saturation switching branches of the apparatus according to FIG. 1.

FIG. 2 shows the structure of the submodules 12 of the first and second saturation circuits 10, 11 in more detail. It can be seen that the submodules for both saturation switching branches 10 and 11 have an identical structure. It can also be seen that the power semiconductor switches 20, 21, 22 and 23 comprise a so-called IGBT 31, with which a freewheeling diode 32 is connected in parallel in an opposite sense. The structure of an IGBT with a freewheeling diode is fundamentally known, with the result that its method of operation does not need to be discussed in any more detail at this point. The important fact is that the freewheeling diode 32 is used to protect the IGBT by means of voltages in the reverse direction. In this case, the IGBT 31 and diodes 32 are accommodated in a common switch housing. The IGBT 31 and the freewheeling diode 32 are referred to together as power semiconductor switches here.

Each submodule 12 is in the form of a so-called full-bridge and comprises a first series circuit branch 32 and a second series circuit branch 34 each comprising two power semiconductor switches 20, 21 and 22 and 23, respectively, which are connected in series. The potential point between the power semiconductor switches 20 and 21 is connected to the first connection terminal 13 and the potential point between the power semiconductor switches 22 and 23 of the second series circuit branch 34 is connected to the connection terminal 14 of the submodule 12.

Figure 3:
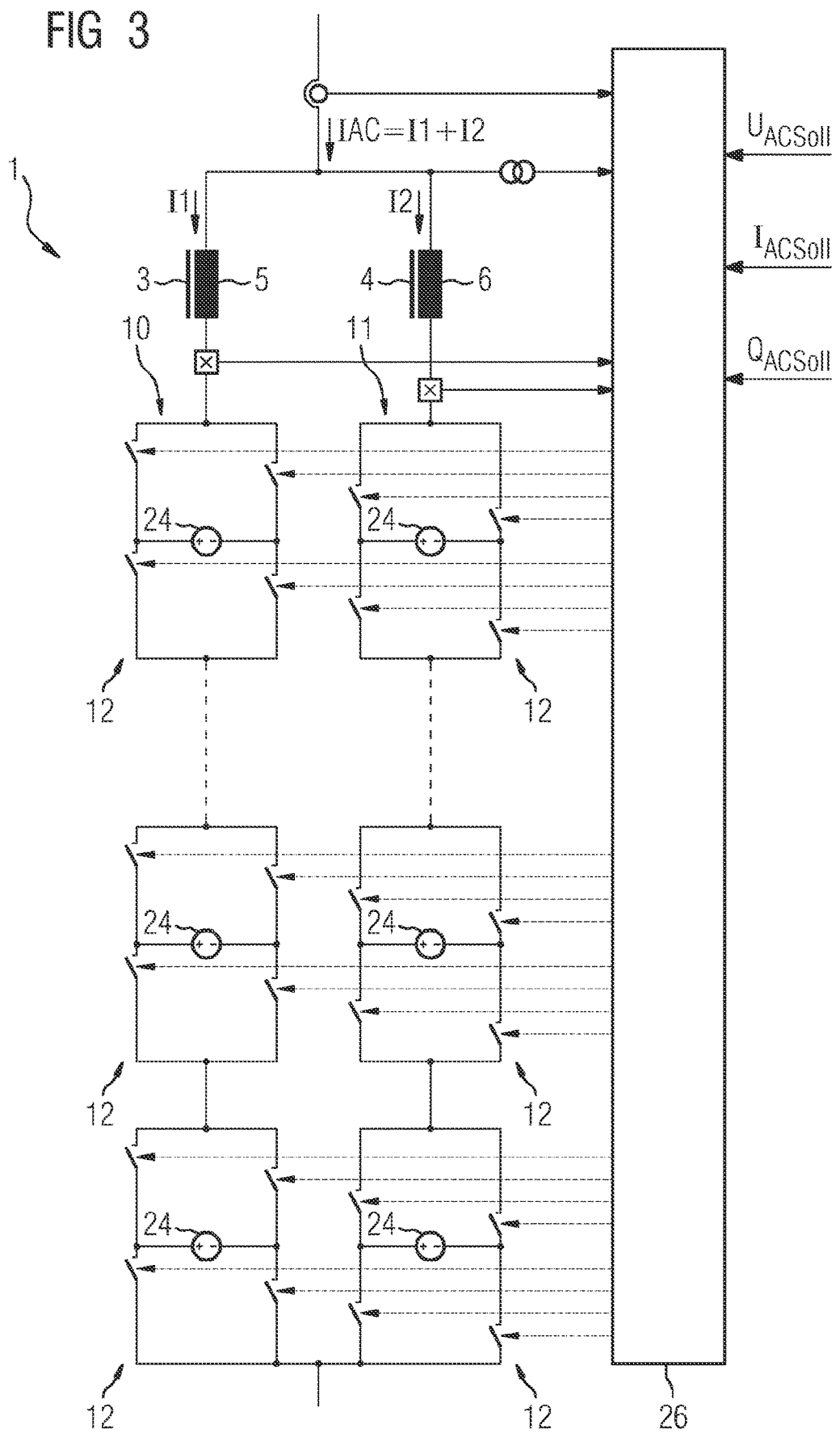
FIG. 3 shows a further exemplary embodiment of the apparatus according to the invention without connections.

FIG. 3 shows a further exemplary embodiment of the apparatus 1 according to the invention, wherein only the component parts for connection to a phase of the high-voltage network are shown for reasons of clarity. Furthermore, the high-voltage connections 42 and 44 and the tank 2 having the high-voltage bushings 8 are not shown.

It can be seen that each saturation switching branch 10 or 11 comprises a series circuit comprising a plurality of submodules 12 which are all controlled by the control unit 26 either in an identical manner or differently, with the result that the DC voltage for generating the direct current used to saturate the core limbs 3, 4 can be scaled according to the respective requirements.

Figure 4:
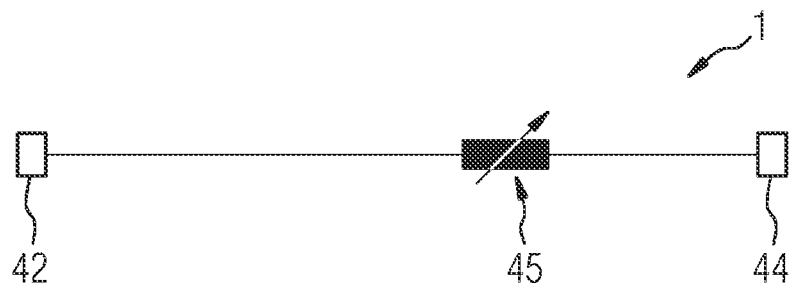
FIGS. 4, 5 and 6 show even more highly schematic illustrations of exemplary embodiments.

FIG. 4 shows an even more highly schematic illustration of an exemplary embodiment of the apparatus 1 according to the invention. Only the so-called FVSR 45 is shown. The FVSR 45 comprises the high-voltage windings, the core and the saturation switching branch(es) 10 and/or 11 and the control unit for controlling the power semiconductor switches. FIG. 4 can therefore also be interpreted as a more highly schematic illustration of the exemplary embodiment according to FIG. 1.

Figure 5:
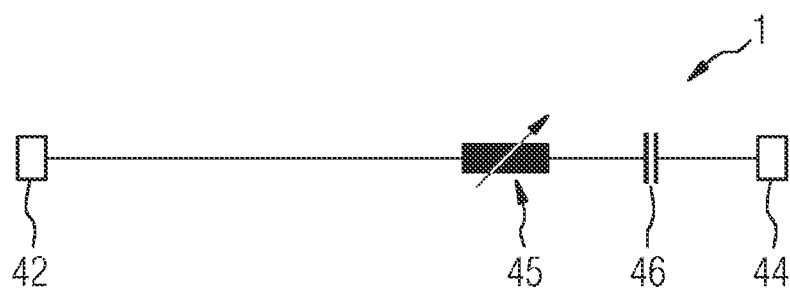

FIG. 5 shows a further exemplary embodiment of the apparatus 1 according to the invention, wherein, in addition to the FVSR 45, a capacitor 46 or a capacitor bank 46 is illustrated. In this case, the capacitor 46 is arranged between the second high-voltage connection 44 and the FVSR 45. The control range of the apparatus 1 according to the invention is increased by virtue of the capacitor 46. The high-voltage lines of an energy supply network, which is operated with alternating current, usually act like a capacitor. For reactive power compensation, an inductively acting component part, such as the high-voltage windings according to the invention, must therefore be integrated in the network. However, it is also possible to compensate for inductive reactive power in the network by providing a capacitor 46.

Figure 6:
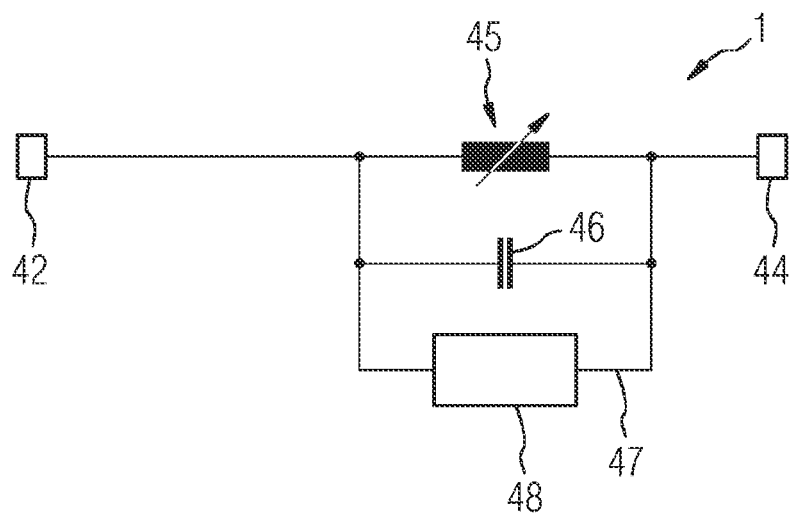

FIG. 6 shows a further exemplary embodiment of the apparatus 1 according to the invention, wherein the capacitor 46 is connected in parallel with the FVSR 45 with the aid of a bridging branch. A protective branch 47, in which a non-linear resistor 48 is arranged, is also provided. The non-linear resistor is used to protect the FVSR 45 and the capacitor 46 from overvoltages. As already stated, the non-linear resistor 48 has a high impedance at the operating voltage. In the event of overvoltages, the non-reactive resistance falls quickly, however, with the result that the current commutates to the protective branch 47.

Figure 7:
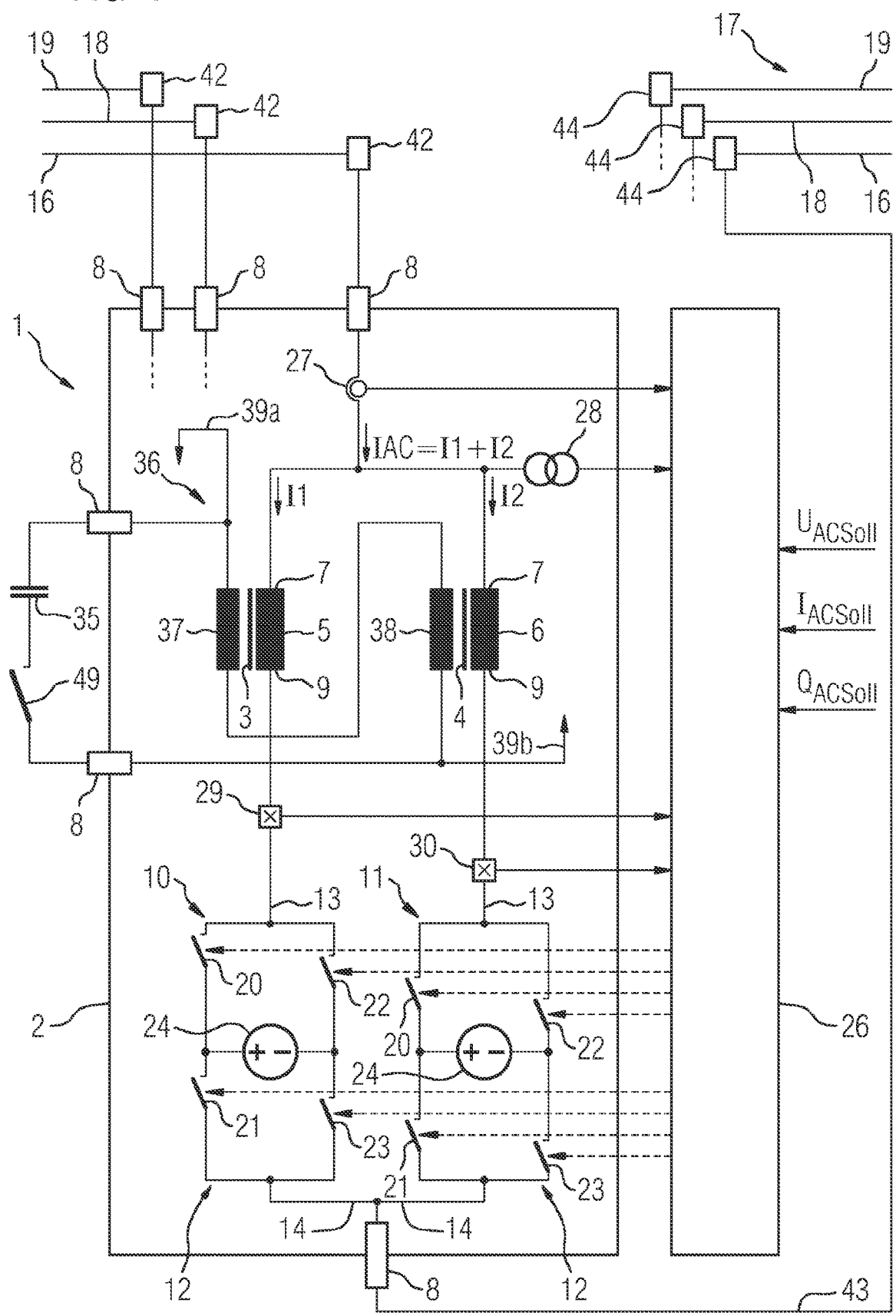
FIG. 7 shows a further exemplary embodiment of the apparatus according to the invention.

FIG. 7 shows a further exemplary embodiment of the apparatus 1 according to the invention which partly corresponds to the exemplary embodiment shown in connection with FIG. 1. In addition to the component parts or elements already described in FIG. 1, the exemplary embodiment of the apparatus 1, as shown in FIG. 7, also has a capacitively acting component part which is in the form of a capacitor 35 in the exemplary embodiment shown. The capacitor 35 is connected in parallel with a compensation winding 36, wherein the compensation winding 36 is composed of two partial compensation windings 37 and 38 which are connected in series with one another. The partial compensation winding 37 is inductively coupled to the first high-voltage winding and the second partial compensation winding 38 is inductively coupled to the high-voltage winding 6. In this case, the high-voltage windings 5 and 6 and the respective partial compensation winding 37 or 38 are arranged concentrically with respect to one another, wherein they surround the same core section 3 or 4 of the core which is otherwise not illustrated any further. FIG. 7 illustrates only one additional winding 36 for the phase shown there. However, further compensation windings are provided for the other phases in the tank 2 and have an identical structure and are connected to the capacitor 35 in the same manner. In this case, the compensation windings 36 of the different phases are connected to one another in a delta circuit. This delta circuit is indicated by arrows 39a and 39b. A switch 49 is also schematically illustrated in the parallel branch of the compensation winding, in which the capacitor 35 is arranged, which switch comprises two thyristors which are connected in parallel in opposite senses in the exemplary embodiment shown. With the aid of the electronic switch 49, the capacitor 35 can be connected in parallel with the compensation winding 36 or the action of the capacitively acting component part 35 can be suppressed.

The capacitor 35 is illustrated in FIG. 7 as an individual capacitor which is arranged outside the tank 2 of the FVSR. However, the capacitor 35 comprises a number of capacitors arranged in series or in parallel with one another and can therefore also be referred to as a capacitor bank. In this case, the number of capacitors connected in parallel or in series depends on the respective requirements, wherein the capacitive action can be increased or reduced.

The capacitor or, in other words, the capacitor bank 35 is arranged outside the tank 2 of the FVSR, like the switch 49. In a deviation from this, arrangement in a common tank is naturally also possible. In order to enable an electrical connection between the compensation winding 36 in the tank 2, expedient bushings 8 are provided again and make it possible to guide the high-voltage lines through the wall of the tank 2, which is at ground potential, with dielectric strength.

The invention claimed is:

1. An apparatus for reactive power compensation in a high-voltage network having at least one phase conductor, the apparatus comprising:
    at least one first high-voltage connection configured for connecting to the at least one phase conductor;
    a first and a second core section being part of a closed magnetic circuit;
    a first high-voltage winding surrounding said first core section;
    a second high-voltage winding surrounding said second core section and connected in parallel with said first high-voltage winding;
    at least one saturation switching branch configured to saturate said first and second core sections and having controllable power semiconductor switches;
    a controller for controlling said controllable power semiconductor switches for said at least one first high-voltage connection;
    said first and second high-voltage windings are connected, by way of their high-voltage end, to said at least one first high-voltage connection and being connected, on their low-voltage side, to said at least one saturation switching branch; and
    a second high-voltage connection for connecting to the at least one phase conductor, wherein said at least one saturation switching branch is connected, on its side facing away from said first and second high-voltage windings, to said second high-voltage connection, with a result that the apparatus being connected in series with the at least one phase conductor.

2. The apparatus according to claim 1, further comprising at least one capacitive unit, said second high-voltage connection is connected to said at least one saturation switching branch via said at least one capacitive unit.

3. The apparatus according to claim 1, further comprising a bridging branch having a capacitive unit, said first and second high-voltage windings and said at least one saturation switching branch being bridged by means of said bridging branch.

4. The apparatus according to claim 3, further comprising a protective branch having a non-linear resistor, said protective branch connected in parallel with said bridging branch.

5. The apparatus according to claim 2, wherein said capacitive unit is a capacitor or a capacitor bank.

6. The apparatus according to claim 1, further comprising a tank having an insulating fluid, said first and second high-voltage windings and said at least one saturation switching branch are disposed in said tank.

7. The apparatus according to claim 1, wherein said at least one saturation switching branch has at least one two-pole submodule with a bridge circuit having said controllable power semiconductor switches and a DC voltage source, with a result that said DC voltage source being either connected in series with at least one of said first and second high-voltage windings or bridged depending on a control of controllable said power semiconductor switches.

8. The apparatus according to claim 7, wherein said at least one two-pole submodule has a first connection terminal, a second connection terminal and forms a full-bridge circuit having a first series circuit branch and a second series circuit branch which are each connected in parallel with said DC voltage source, each of said first and second series circuit branch has a series circuit containing two of said controllable power semiconductor switches (20, 21, 22, 23), wherein a potential point between said controllable power semiconductor switches of said first series circuit branch is connected to said first connection terminal of said at least one two-pole submodule and a potential point between said controllable power semiconductor switches of said second series circuit branch is connected to said second connection terminal of said at least one two-pole submodule.

9. The apparatus according to claim 7, wherein each of said controllable power semiconductor switches is an insulated gate bipolar transistor with a freewheeling diode connected in parallel in an opposite sense, a gate turn-off thyristor or a transistor switch.

10. The apparatus according to claim 7, wherein said DC voltage source has an energy store.

11. The apparatus according to claim 10, wherein said energy store being connected to a supply network.

12. The apparatus according to claim 1, further comprising:
    at least one capacitively acting component part; and
    compensation windings being inductively coupled to said first and second high-voltage windings, wherein said compensation windings are connected to said at least one capacitively acting component part.

13. The apparatus according to claim 12, wherein said capacitively acting component part has capacitors.

* * * * *